United States Patent [19]

Chernowitz

[11] 3,925,814

[45] *Dec. 9, 1975

[54] SOUND CARD AND SOUND APPARATUS SUITABLE FOR MULTI-CHANNEL USE

[76] Inventor: Maurice E. Chernowitz, 91 Payson Ave., New York, N.Y. 10034

[ * ] Notice: The portion of the term of this patent subsequent to Oct. 23, 1990, has been disclaimed.

[22] Filed: Aug. 23, 1973

[21] Appl. No.: 390,748

Related U.S. Application Data

[63] Continuation-in-part of Ser. No. 103,589, Jan. 4, 1971, Pat. No. 3,767,208.

[52] U.S. Cl. ........................ 360/2; 35/35 C; 40/28.1; 360/63; 360/117

[51] Int. Cl.² ........................ G11B 25/04; G11B 15/12; G11B 5/12

[58] Field of Search ............ 360/2, 63, 88, 101, 117; 35/8 A, 35 C; 40/28.1

[56] References Cited

UNITED STATES PATENTS

| | | | |
|---|---|---|---|
| 2,603,006 | 7/1952 | MacChesney et al. | 360/2 |
| 3,471,654 | 10/1969 | Dollenmayer | 360/101 |
| 3,678,212 | 7/1972 | Wild | 360/2 |
| 3,685,836 | 8/1972 | Chernowitz | 360/2 |
| 3,767,208 | 10/1973 | Chernowitz | 360/2 |

*Primary Examiner*—Richard E. Aegerter
*Assistant Examiner*—Steven L. Stephan
*Attorney, Agent, or Firm*—Sandoe, Hopgood & Calimafde

[57] ABSTRACT

This invention relates tô audio apparatus in which a card with a magnetic sound track, or other type sound track, extending parallel to an edge of the card and simple manual operated means produce relative movement of the card and a sound head. One embodiment uses a power drive to obtain a more uniform rate of relative movement. Extra length of reproduction is provided on the card by having multi-channel tracks with reverse runs and switch means for maintaining the sound head operative on different selected channels at various times during the operation of the apparatus. Reversible motors permit successive sound tracks to be used with the cards moving in opposite directions.

9 Claims, 8 Drawing Figures

SOUND CARD AND SOUND APPARATUS SUITABLE FOR MULTI-CHANNEL USE

RELATED APPLICATION

This application is a continuation-in-part of my co-pending application Ser. No. 103,589, filed Jan. 4, 1971, now U.S. Pat. No. 3,767,208.

BACKGROUND AND SUMMARY OF THE INVENTION

One object of this invention is to provide an audio apparatus that is not only far simpler in construction than card-operated devices of the prior art, but which can be used without any stationary support; that is, with the record card held in one hand and the sound head support held in the other hand. To make such apparatus practical and convenient to use, it is essential that adequate guiding of the card be provided.

Various constructions obtain operation of the apparatus on transversely spaced channels of a sound track on a card. This may include sound heads adjustable transversely with respect to the card guide or fixed transversely with multiple contacts on the track channels, which contacts are made effective selectively in the desired sequence according to the order in which the respective channels are recorded.

This invention can also be constructed with combinations of a multi-contact sound head with adjustment of the sound head transversely of the sound track so that in one position the sound head can reproduce as many subchannels as the head has contacts; and then the head can be adjusted to another position to reproduce an additional number of sub-channels equal to the number of contacts of the head. Adjustments of the card transversely of its direction of travel can also be used in place of adjustment of the sound head or in combination with the adjustment of the sound head.

Where a card has a plurality of parallel sound tracks, the recording and/or reproducing apparatus, if motor operated, can be provided with means for reversing the motor so that the sound head can travel along one track in one direction and then travel along another track in the opposite direction to obtain continuation of the recording or reproducing without having to move the apparatus or the card back to the position from which the recording or reproduction was started on the first track.

The invention is primarily intended for the reproduction of bits (parcels) of sound, or relatively short sound, from cards bearing audio-visual information of usual size, cards which can be heard in any order desired, or any order educationally desirable, and like index cards can conveniently be stored and filed. However, longer sound is also made available by way of a plurality of sound channels produced in several ways. Thus stereo and other multi-sound channels effects in recording and reproduction are also possible thereby, such as a student recording his answer on one channel and then checking his answer against a pre-recorded model appearing on another sound channel. Speech on one channel, music on another sound channel, etc., could be used selecting one, two or more channels at a time.

Furthermore, the invention lends itself to countless other uses, such as the reproduction of sound from cards of longer than usual size or even from rolls, also to the reproduction of sound recorded, for instance, even from the edges of the pages of a bound book, especially if such pages are either reinforced with thick margins, margins made of recorded sound material and affixed onto the paper along side the edges, or else pages made up simply of thick paper or card stock, strong enough to offer resistance to bending when used with the device's guide, as the latter slides along the page's edges.

The invention also lends itself very suitably to the so-called "programmed teaching" technique in which the audio-visual subject matter is broken down into many elementary units, small bits of knowledge, presented one at a time.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views.

DESCRIPTION OF PREFERRED EMBODIMENT

Figures 1, 1A, 2, 3, 4, 5, 5A, 6:
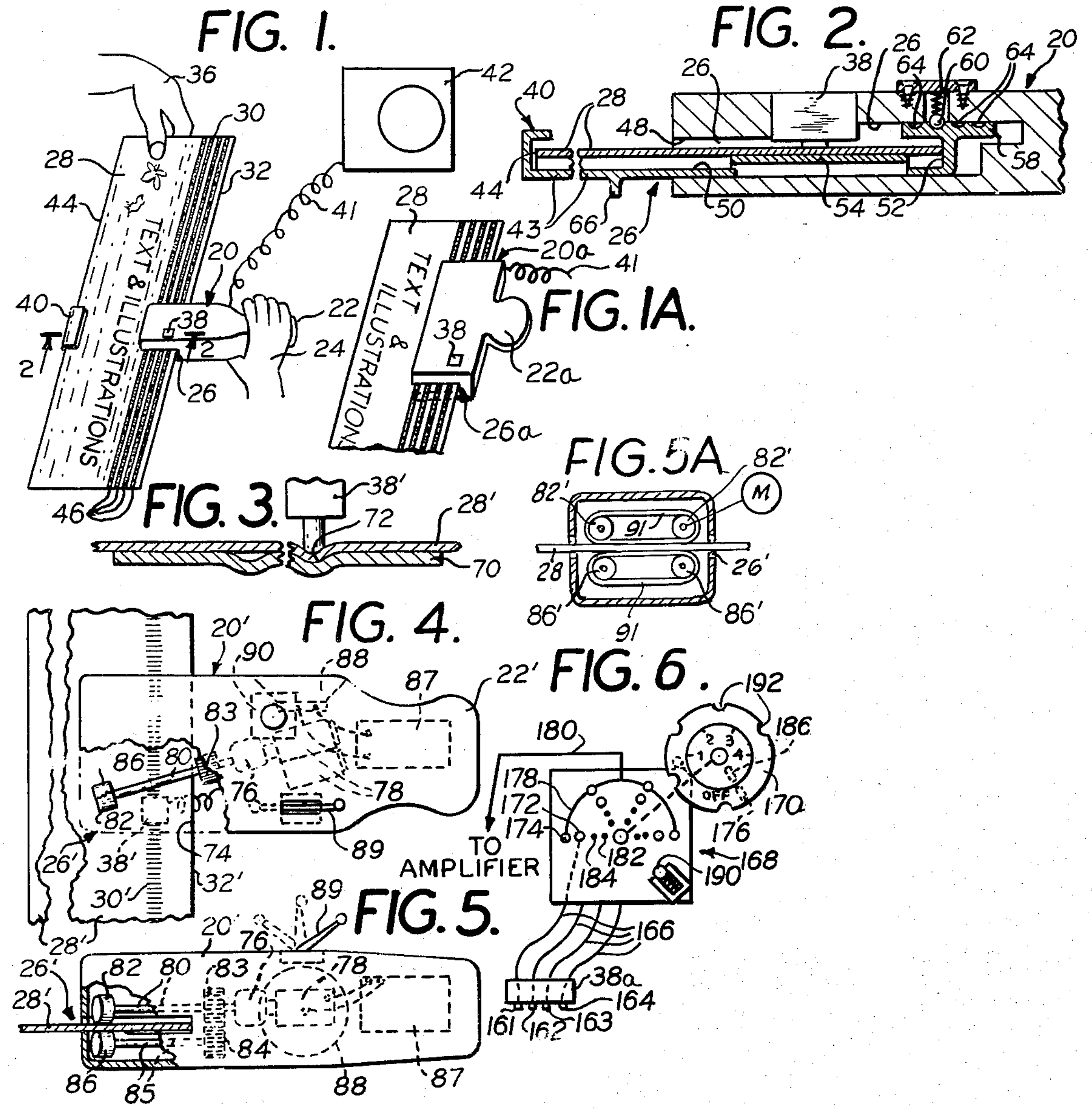
FIG. 1 is a diagrammatic, isometric view showing this invention and the manner in which it is operated manually.
FIG. 1A is a view like FIG. 1, but with some modification.
FIG. 2 is a greatly enlarged, fragmentary, sectional view taken on the line 2—2 of FIG. 1.
FIG. 3 is a fragmentary diagrammatic view showing a modified construction for maintaining the card in contact with the sound head in the apparatus FIGS. 1 and 2.
FIG. 4 is an enlarged, diagrammatic, top plan view of a modification of the construction shown in FIG. 1.
FIG. 5 is an elevation, partly broken away and in section of the construction shown in FIG. 4.
FIG. 5A is a modification of the structure shown in FIGS. 4 and 5.
FIG. 6 is a diagrammatic view of a sound head for use on the sound tracks having multiple channels as shown in some of the other views, and also shows a switching system for use with the multi-contact sound head.

FIG. 1 shows a frame 20 having a grip portion 22 by which it can be conveniently held by one hand 24 of an operator. There is a guideway 26 formed in one end of the frame 20 and this guideway faces away from the grip portion 22 so that a card 28 can be conveniently inserted into the guideway.

The card 28 has a sound track 30 on its top surface extending parallel to a longitudinal edge 32 of the card. The guideway 26, in the frame 20, is a channel with top and bottom walls and a center wall against which the edge 32 contacts. This channel construction will be explained more fully in connection with FIG. 2 but for the present it should be noted that the card 28 is substantially longer than the guideway 26, but the guideway has a center surface in contact with edge 32 along sufficient length of the edge to hold the edge 32 parallel to the center surface of the guideway while the card 28 is being held in the operator's other hand.

The frame 20 carries a sound head 38 which contacts with the sound track 30 on the card 28 for recording or reproducing sound as the case may be. The sound head 38 is connected by a flexible conductor cable 41 to sound recording or reproducing means 42 which may be at a stationary location. If desired, the frame 20 can be constructed with a speaker, batteries, and necessary circuitry to form a self-contained portable audio unit for cooperation with the sound track 30. The sound recording or reproducing apparatus 42 forms no part of the present invention and no illustration of its circuitry is necessary for a complete understanding of this invention.

From FIG. 1 it will be apparent that the record card 28 can be held stationary by the hand 36 while the frame 20 is moved along the edge of the card or the frame 20 can be held stationary by the hand 24 while the other hand 36 moves the record card to obtain the relative movement of the card and sound head. Also, it is a natural movement for the operator to move both hands 24 and 36 simultaneously in opposite directions to obtain the necessary relative movement of the card 28 and the sound head 38 and this movement with both hands provides for more convenient control of the relative speed to maintain the desired pitch of the sound produced by the apparatus.

The optimum length of the center surface of the guideway 26 which contacts with the edge 32 of the card 28 depends upon the size of the card and particularly upon the width of the card at right angles to the guiding edge 32 and also depends upon whether the card 28 is guided along two edges or only along one edge.

The frame 20 shown in FIG. 1 has a guideway extension 40 with a bottom wall 43 extending across the bottom surface of the card 28 and the extension 40 then extends upward around an edge 44 of the card and inward across a limited part of the top surface of the card to form a channel guideway for the card edge 44. The edges 32 and 44 are parallel and so are the center surfaces of the channels which contact with these edges 32 and 44. The distance between these confronting center surfaces of the channels at opposite sides of the card 28 is substantially equal to the width of the card but with running clearance so that the card can pass through the channels freely while still being confined transversely to such a limited transverse movement that the sound track always remains under the sound head 38.

The frame 20 can be made without the guideway extension 40 and when so constructed, the bottom surface of the channel of the guideway 26 is preferably substantially the same extent as the top surface, as in FIG. 1A.

If the frame 20 is to be used without the guideway extension 40, then the length of the guideway 26 must be sufficient to enable a person holding the card and frame in different hands to maintain alignment of the card conveniently. It should be at least about one-half the card width and greater length is better, as in FIG. 1A.

If the frame 20 is made with the guideway extension 40, the length of the guideway 26 for the channels on both sides of the card must be long enough to prevent the card from becoming "cocked" when running in the confronting channels as bearings. A length in excess of about one-half the width of the card can be used and preferably a greater length.

FIG. 1A shows a frame 20*a* which is longer in its direction of movement so as to have a longer guideway 26*a*. The grip portion 22*a* is preferably the same as the grip portion 22 of FIG. 1.

FIG. 2 shows the portion of the frame 20 which holds the card 28. In the construction shown in FIG. 2, the guideway 26 is adjustable transversely to move the card

28 transversely with respect to the sound head 38 so as to reproduce different channels 46 of the sound track 30.

The guideway 26 has the top wall 48 and in the construction illustrated in FIG. 2 has a bottom wall 50 and an end wall or center surface 52 that contacts with the edge 32 of the card 28. The bottom wall 50 which constitutes part of the bottom wall 43 of the extension 40, is made of resilient sheet material and has a tongue portion 54 displaced from the bottom wall 50 and which has an upward bias for holding the card 28 in contact with the sound head 38.

The end wall 52 has a top flange 58 in sliding engagement with the top wall 26 and there is a detent comprising a ball 60 held against the flange 58 by a compression spring 62. There are depressions 64 in the top surface of the flange 58 and with which the ball detent 60 engages to hold the flange 58, the end wall 52 and the connected structure against transverse movement.

Each of the depressions 64 corresponds with a different channel of the sound track so that the ball detent 60 holds the guideway, and the card 28, in position for one or another of the sound channels to register with the sound head 38 for each depression 64 with which the detent 60 engages.

The tongue 54 is truck out of the bottom 50 and is, therefore, of one piece with it, and the tongue 54 extends in the direction of movement of the card 28 through the guideway and is wide enough to be under the sound head 38 regardless of the adjustment of the flange 58 with respect to the detent 60. A handle 66 on the under side of the bottom wall 43 can be used for moving the guideway to engage the detent 60 with different depressions 64.

When the frame 20 is made without the adjustable feature for adjusting the card 28 transversely under the sound head 38, then the channel of the guideway 26 is formed by the fixed structure of the frame 20 and can be made with less distance between the top and bottom walls than that shown in FIG. 2. Some resilience for maintaining the card in contact with the sound head can be provided by the resilience of the card itself as shown in FIG. 3.

In FIG. 3 a sound head 38' engages a card 28' resting on a bottom wall 70 of a guideway. The portion of the bottom wall 70 immediately below the sound head 38 has a depression 72 in its supporting surface so that the card 28' is unsupported immediately under the sound head 38' until the card is deflected downward into the space under it provided by the depression 72. This deflection bends the card and the resiliencey of the card resists the deflection and thus maintains a pressure between the card and the sound head so as to hold the sound track in firm contact with the sound head. The degree of pressure can be determined for the thickness of the card by having a wider or narrower depression 72. This expedient shown in FIG. 3 for maintaining contact of the sound head with the card can be used with any of the other modifications of the invention shown in other figures of the drawing.

FIGS. 4 and 5 show another modified form of the invention. Parts corresponding to the construction shown in FIG. 1 are indicated by the same reference character with a prime appended. The frame 20' has a channel with an end wall or center surface 74 with which a card edge 32' contacts to maintain a sound track 30' under a sound head 38' while the card 28' is moved with respect to the frame 20'. The construction shown in FIG.

4 has no extension of the guideway for contact with the other side of the card 28.

In FIGS. 4 and 5, there is a motor 76 powered by a battery 78 and connected by a shaft 80 to a roller 82 that bears against the top surface of the card 28'. A gear 83 on the shaft 80 meshes with another gear 84 on a shaft 85 which rotates a roller 86 in contact with the bottom surface of the card 28'. The rollers 82 and 86 are located in substantially vertical alignment with one another and thus provides a roll pass through which the card 28' moves. The shafts 80 and 85 have suitable bearings which are omitted in the drawing for clearer illustration; and the rollers 82 and 86 have resilient surfaces which grip the card with sufficient friction to advance it along the guideway 26' as the rollers rotate.

A feature of the rollers 82 and 86 is that their location along the length of the guideway 26', that is, in the direction in which the sound track moves through the guideway, is substantially the same as that of the sound head 38'. Thus the card 28', which is advanced into the guideway 26' from the upper end by hand, reaches the rollers 82 and 86 at substantially the same time that it reaches the sound head 38'. The rollers take over the speed of the advance of the card, therefore, as soon as the card is moved far enough for the speed of movement to become significant; that is, as soon as the sound track has reached the sound head 38'. The advantage of having the rollers 82 and 86 at this location is that they continue to advance the card at a controlled speed until the last part of the sound track has passed under the sound head 38'. With the rollers at any other location, they would not function to control the advance of the card during the entire period that the sound track is under the sound head and two pairs of rollers would be necessary for advancing the card at controlled speed for the entire length of the track.

The motorized modification shown in FIGS. 4 and 5 can have the amplifying and speaking apparatus at a remote location from the frame 20, as in the case of FIG. 1; but the frame 20' of FIGS. 4 and 5 houses an amplifier 87 which is connected with the sound head 38'. The frame 20' also carries a speaker 88 so that the acoustical apparatus is part of a self-contained unit in the construction of FIGS. 4 and 5.

The sound head 38' is preferably a multi-contact sound head, as will be described in connection with FIG. 6, and the card 28' has a sound track 30' which is equipped with a plurality of channels or sub-channels close enough together to cooperate with the multiple contacts of the sound head 38'. A switch 89 from the frame 20' is connected between the battery 78 and the motor 76 with the circuit constructed so that the motor runs in one direction when the switch is in the position shown in full lines in FIG. 5; and the motor runs in the opposite direction when the switch is shifted into the leftwardly sloping position shown in dotted lines in FIG. 5. The switch 89 has an intermediate position in which it shuts off all power to the motor. The switch 89 is located in a conventient position for operation by the same hand that holds the handle portion 22' of the frame 20'.

For making the sound head 38' effective for different tracks with which it contacts there is a switch 90 which will be described in connection with FIG. 6. For the present, it is sufficient to understand that the switch 90 is a multiple position switch that moves into as many positions as there are contacts on the sound head 38' for the purpose of making the various contacts effective to reproduce the material recorded on each sound track selectively.

FIG. 5A shows a modified construction in which two pairs of rollers 82', 86' are spaced from one another lengthwise of a guideway 26'. Endless belts 91 pass around corresponding rollers of both pairs of rollers. The card 28' is gripped between the belts 91 and is advanced by direct contact with the belts.

FIG. 6 shows a sound head **38*a* with four contacts 161–164 that operate along sub-channels ("quarter tracks") of the sound track channels. The circuits of these contacts 161–164 have flexible conductors 166 leading to a switch 168 that is operated by a knob 170. The switch 168 is a five position switch as indicated by the numerals 1 through 4 and the legend "off" on the knob. With the switch in position 1, only the contact 161 is effective and no sound from the subchannels of contacts 162, 163 and 164 is reproduced. When the switch 168 is turned to position 2, only the second quarter channel is effective; and similarly positions 3 and 4 make sub-channels 3 and 4,** respectively, effective and only those sub-channels. In the off position, none of the subchannels is effective.

FIG. 6 shows the left hand conductor 166 connected with a contact 172 of the switch 168. An adjacent complementary contact 174 is located in position to be connected in the circuit with the contact 172 by a bridging contact 176 on the lower face of the knob 170. Thus when the bridging contact 176 is in position to connect the contacts 172 and 174, a circuit is completed from the left hand conductor 166 through the contacts 172, 176 and 174 to an arcuate bus bar 178 which is connected by a conductor 180 to the amplifier of the apparatus.

There are other contacts along the bus bar 178 corresponding to the contact 174 but for each of the different positions to which the knob 170 is to be turned to make the sound head **38*a* effective for reproducing from the other contacts 162, 163 and 164. Switch 168 also has contacts corresponding to the contact 172 for each of the switch positions so that the bridging contact 176 on the underside of the knob will establish a circuit from each of the conductors 166 to the amplifier conductor 180** for the various positions of the switch.

The switch 168 also has contacts 182 and 184 in line with the contacts 172 and 174 and in position to be bridged by another bridging contact 186 on the underside of the knob 170. The connecting of the contacts 182 and 184 by the bridging contact 186 establishes a circuit for supplying power to the motor when the switch is used on one of the motor-operated modifications of the invention such as shown in FIGS. 4, 5 and 5A. Different batteries in the frame 20' may be used for the motor 76 and for the amplifier and speaker.

There are other contacts corresponding to the contacts 182 and 184, at each of the other switch positions, and a circuit is closed between these contacts for each of the operating positions of the switch as the knob is turned to these different operating positions. When the bridging contact 186 touches the contacts 182 and 184 it closes a circuit to supply power to the motor; but the circuitry of the motor is arranged so that with the switch in the positions 1 and 3, the motor operates in one direction; and with the switch in the positions 2 and 4, the motor operates in the reverse direction so that the card can advance in one direction and then reverse its direction of travel for the next subchannel. This requires, of course, that the sub-channels be recorded in opposite directions. This is a feature of the present invention, but it will be understood that this motor reversal and the recording of channels in opposite directions is an optional feature for making the use of the invention more convenient.

The circuits for the motor are not shown since such motor controls are conventional and well understood in the art. The switch 168 is shown diagrammatically and various other types of switches can be used for activating the contacts 161–164 selectively. For instance, other switch systems could be used for other functions and effects, such as a switch system that can activate one contact at a time for either recording or playback, as well as two or more contacts simultaneously for two-channel stereo effects as needed, or any other effects, selectively, such as recording "sound on sound," or listening to one channel while recording on another.

In the switch embodiment shown, means are preferably provided for releasably holding the switch 168 in the various positions to which it can be turned. In the construction illustrated there is a spring pressed ball detent 190 which snaps into notches 192 located around the circumference of the knob 170 whenever the knob reaches a position corresponding to the positions 1–4 and the off position.

From the foregoing description it will be evident that the invention offers a number of different options which can be used in various combinations. For multicontact the multicontact sound head 38A of FIG. 6 can be used with switching means so that no adjustment of the sound head or card is necessary in order to reproduce from four channels, but the sound head 38A can be made adjustable; and if it is adjustable into four different positions, the apparatus becomes capable of reproducing from sixteen channels selectively. Likewise, the card can be adjustable transversely of its direction of travel and this card adjustment can be combined with the multi-contact head 38A of FIG. 6 and/or with the movable sound heads of FIGS. 6 and 9. Adjustable sound heads and multi-contact sound heads can be used with any of the modified constructions illustrated and so can most of the other modifications shown in the drawing.

The preferred embodiments of the invention have been illustrated and described but changes and modifications can be made and some features can be used in different combinations without departing from the invention as defined in the claims.

What is claimed is:

1. Audio apparatus having a card with a substantially straight longitudinal edge along one side thereof, a sound track on the card extending parallel to said edge and including a plurality of sub-channels thereon, a frame having a portion that is shaped to fit the grip of one hand of an operator holding it during use, a channel shaped guideway at one end of the frame facing away from the portion that is gripped in one hand, said channel shaped guideway having top and bottom guide surfaces having portions that extend to the end of the frame remote from the grip portion and that covers the portion of the card inward from said longitudinal edge, including the sound track, and with a mid-surface of the guideway between the top and bottom guide surfaces thereof in angular relation to the top and bottom guide surfaces and with which said longitudinal edge of the card contacts to guide the card during relative movement of the card and frame lengthwise of the sound track, the guideway being substantially shorter than the card in the direction of relative movement of the card and guideway, a sound head carried by the frame with a portion that projects through the top guide surface of the guideway into working relation with the sound track when the edge of the card is against the mid-surface of the channel, the card being substantially greater in width than the part that extends into the guideway whereby most of the card is visible beyond the guideway and there is a wide card area beyond the end of the guideway that can be gripped by the other hand of an operator who is holding the grip portion with his first hand, the sound head having different contacts that operate along the different sub-channels of the sound track, and switch means operable into different positions to make different contacts effective.

2. The audio apparatus described in claim 1 characterized by a motor and rollers carried by the frame, said rollers being driven by the motor at a speed that advances the card at the speed for which the sound track is recorded, said rollers being in position to grip the card between them and to move it through the channel at said speed after the card has been advanced into the channel by hand manipulation.

3. The audio apparatus described in claim 2 characterized by said rollers comprising a pair of opposed rollers carried by the frame and located along the guideway in position to grip and advamce the card at said speed after the card has been moved into the grip of the rollers by hand manipulation of the card and frame, the rollers being located at a different distance from said longitudinal edge of the card than are the track and sound head, said rollers being at a location lengthwise of the guideway substantially the same as that of the sound head so that as the card is advanced along the guideway by hand manipulation, the rollers grip and continue the advance of the card from substantially the time that the card reaches the location at which the sound head operates on the track and at which speed of the card movement becomes significant in the operation of the apparatus, and said pair of rollers continuing the advance of the card until the trailing end of the card is substantially at the sound head.

4. The apparatus described in claim 3 characterized by switch means that reverse the direction of operation of the motor at the same motor speed to move the card through the guideway in either of opposite directions.

5. The apparatus described in claim 2 characterized by the switch means including circuitry that reverses the direction of operation of the motor for each operation of the switch means into a different position such that as successive channels are selected by the switch the card is driven in opposite directions.

6. The apparatus described in claim 1 characterized by the sound head being located above the sound channels on the card, and means on the other side of the card for maintaining said sound channels on the card in resilient contact with the sound head.

7. The apparatus described in claim 6 characterized by the means on the other side of the card being a spring portion of the guideway that urges the card upward against the sound head.

8. The apparatus described in claim 6 characterized by the means on the other side of the card being a recess below the part of the card with which the sound head has contact, the card spanning the recess and maintaining a resilient contact with the sound head by virtue of the yielding stiffness of the part of the card that spans the recess.

9. An audio apparatus as described in claim 1 characterized by said plurality of contacts of the sound bead simultaneously touching different parallel channels of the sound track, and switch means having electric circuits connecting with the different contacts of the sound head and movable into different positions to put individual contacts of the head selectively into the circuit with the audio means at successive times, and further characterized by a motor that operates at the same forward and reverse speed, and means driven by the motor for producing relative movement of the card and sound head, the switch being a double function switch including means for changing the direction of the motor drive when the switch is moved into said different positions selectively.

* * * * *